United States Patent Office 3,674,464
Patented July 4, 1972

3,674,464
PROCESS FOR REMOVING COPPER
FROM MOLYBDENUM
Vincent Chiola, Towanda, and Phyllis R. Dodds, Wysox, Pa., assignors to GTE Sylvania Incorporated
No Drawing. Filed Mar. 27, 1970, Ser. No. 23,446
Int. Cl. C22b 49/00
U.S. Cl. 75—101 R                    5 Claims

ABSTRACT OF THE DISCLOSURE

A process for removing copper from molybdenum is disclosed that comprises forming an aqueous solution containing molybdenum and copper having a pH of above about 5.7. contacting the solution with an α-hydroxy oxime organic solution to extract the copper into the organic phase without the extraction of molybdenum and recovering the molybdenum. Additionally the copper can also be recovered as a copper salt of a mineral acid.

BACKGROUND OF THE INVENTION

Field of the invention

This invention relates to molybdenum purification. More particularly, it relates to a process wherein copper is removed from solutions containing copper and molybdenum.

Discussion of prior art

The most available source of molybdenum is molybdenite, $MoS_2$ and is usually found in ores containing small amounts of molybdenite on the order of from about 0.1 to 0.2% by weight. The molybdenum content is increased by flotation techniques to yield a crude product containing about 85 to about 90% $MoS_2$. A relatively impure $MoO_3$ is thereafter produced by oxidizing the $MoS_2$ to $MoO_3$ using elevated temperatures and an air atmosphere. Copper is one of the impurities and is present in amounts in excess of about 700 parts per million. For many uses a more purified molybdenum source is required.

Such purified sources of molybdenum are useful and required for the manufacture of molybdenum powder that is thereafter processed by powder metallurgy techniques to a variety of metal products such as wire, rod, sheet, alloys and the like. In many instances high purity molybdenum is desired for molybdenum salts used as catalysts.

Various methods can be used to produce a molybdenum source having a relatively low copper content. For example, sublimation can be used to produce molybdenum trioxide having a copper content of about 100 p.p.m. The sublimation purification technique has low efficiencies and is time-consuming and additionally does not generally produce materials having copper content below about 50 p.p.m. A more recent method of purification involves extraction of molybdenum using tertiary amines from an aqueous solution containing molybdenum and copper. The disadvantage of extracting molybdenum from the impurities is that larger amounts of extractant must be used with the result of lower overall efficiencies.

Recently recovery of copper from aqueous solution from acid or ammonical leach solutions by the use of α-hydroxy oximes is disclosed in U.S. Pat. 3,224,873 issued Dec. 21, 1965 to R. R. Swanson and assigned to General Mills, Inc. The α-hydroxy oximes as disclosed therein are reported to be useful in recovering copper from the solutions over a pH range of from about 3.4 to about 10. Essentially 100% of the copper is disclosed to be extracted at a pH of about 4.59. At higher pH ranges, that is above about 4.5 to about 5.0, other metals are disclosed to be extracted in addition to copper, therefore, indicating that selective extraction between copper and other metals should be carried out at the lower pH ranges. Although the process is efficient for the particular solutions disclosed, under the pH ranges disclosed, it has been discovered that with particular molybdenum-copper solution that the α-hydroxy oximes are not suitable at lower pH ranges but are highly effective at certain narrow higher pH ranges without extraction of molybdenum contrary to the specific teachings of the above patent.

It is believed, therefore, that a process that removes essentially all of the copper from an aqueous molybdenum solution containing copper without the extraction of molybdenum is an advancement in the art.

SUMMARY OF THE INVENTION

In accordance with one aspect of this invention there is provided a process for removing copper from molybdenum comprising forming an aqueous solution containing molybdenum and copper, at a pH of above about 5.7, contacting said solution with an organic phase comprising a water-insoluble liquid hydrocarbon and an α-hydroxy oxime for at least about 20 minutes, separating the resultant copper laden molybdenum barren organic phase and recovering the molybdenum from said aqueous phase.

For a better understanding of the present invention, together with other and further objects, advantages, and capabilities thereof, reference is made to the following disclosure and appended claims.

DESCRIPTION OF THE PREFERRED EMBODIMENTS

An aqueous solution of an impure molybdenum source can be prepared by known methods and the pH is adjusted to above about 5.7. One method is to digest a commerical technical grade $MoO_3$ containing greater than 700 p.p.m. of copper in ammonium hydroxide to form a solution. The resulting pH is above 5.7 and does not require adjusting. Higher pH values can be used, however, a pH of about 9.6 is generally achieved when an aqueous ammonium hydroxide solution is used to dissolve all of the molybdenum oxide present. When highly acidic sources are used, the pH will require adjusting to above 5.7. From a practical standpoint, pH values of from about 6.9 to about 9.6 are generally preferred.

As previously mentioned, the α-hydroxy oximes useful in the practice of this invention are described in U.S. Pat. 3,224,873 and the foregoing description of the α-hydroxy oximes is incorporated herein by reference. In general, these α-hydroxy oxime extractants have the formula

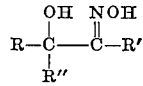

where R, R' and R" may be any of a variety of organic hydrocarbon radicals such as aliphatic and alkylaryl radicals. R" may also be hydrogen. Preferably, R and R' are unsaturated hydrocarbon or branched chain alkyl groups containing from about 6 to 20 carbon atoms. R and R' are also preferably the same. When R and R' alkyl are preferably attached to the carbons substituted with the —OH and =NOH groups attached through a secondary carbon atom. It is also preferred that R" is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are given in the foregoing reference and processes are disclosed for preparing them.

In addition to the above-described α-hydroxy oxime compounds the organic phase comprises a liquid hydrocarbon solvent. Such solvent must, of course, be water immiscible so as to be separable from the aqueous solution originally containing the copper values. Suitable solvents include aliphatic and aromatic hydrocarbons such as benzene, toluene, xylene, Skellysolve B, fuel oil and kerosene. Generally, the α-hydroxy oxime extractant will be present in the organic phase in an amount sufficient to extract at least a portion of the copper values from the aqueous solutions. Preferably the oxime will be present in the amount of from about 5 to about 20% by weight based on the total organic phase with an amount of from 5 to 10% by weight being particularly preferred.

The organic phase may also contain other materials such as a conditioner, which typically is a long chain aliphatic alcohol such as capryl alcohol, isodecanol, tridecyl alcohol or 2-ethyl hexanol. If the conditioner is present in the organic phase, it will be used in amounts of from about 0.5 to 10 weight percent.

Although the volumetric phase ratios of the organic extractant to the aqueous solution can vary depending upon several factors including the concentration of molybdenum in the aqueous phase, the amount of copper present in the aqueous phase and the concentration of α-hydroxy oxime in the organic phase, generally volumetric phase ratios of from about 1:2 to about 2:1 will be used. Since these ratios will extract essentially all of the copper from the aqueous solution within a time period that is practical, generally within 20 to 40 minutes of contact time. In most instances countercurrent extraction will be used, that is, a copper barren organic will first contact the molybdenum solution from which a major portion of the copper has been extracted.

After the organic and aqueous solutions have been in contact for the foregoing period of time, the copper barren aqueous phase is separated from the copper laden organic phase. By "copper barren" it is meant that generally less than 15 p.p.m. of copper is present calculated on the basis of the molybdenum trioxide ($MoO_3$) content in the aqueous phase.

The purified molybdenum containing solution that is copper barren is thereafter further processed to recover molybdenum valves by methods known in the art such as by crystallization of ammonium dimolybdate or ammonium paramolybdate or adjusting the pH and precipitating ammonium tetramolybdate.

Copper can be stripped from the organic extractant thus regenerating it for reuse and recovering the copper values by scrubbing the organic extractant with a mineral acid such as sulfuric acid, hydrochloric acid and the like as is disclosed in United States patent 3,224,873. In most instances, it has been found, however, that sulfuric acid, in particular a 3 molar sulfuric acid solution, is a preferred stripping agent. To remove essentially all of the copper a multiple contact with virgin stripping agent is preferred. Thus by the practice of this invention impure molybdenum sources containing above 700 p.p.m. of copper ($MoO_3$ basis) can be purified to produce a molybdenum source having a copper content of less than about 15 p.p.m. of copper and if desired a highly pure copper sulfate can be recovered as a source of copper and the organic is regenerated for reuse.

To more fully illustrate the invention, the following detailed examples are presented. All parts, proportions and percentages are by weight unless otherwise designated.

EXAMPLE I

Aqueous solutions of ammonium molybdate are prepared by digesting molybdenum trioxide in an aqueous solution of ammonium hydroxide. The pH of the resulting solution is about 9.6. The concentration of molybdenum is about 120 grams per liter. The copper content is about 810 parts per million, $MoO_3$ basis. A series of aqueous molybdenum bearing solutions containing the foregoing levels of copper are prepared by adjusting the pH in increments from 9.6 to 0.5.

A series of organic extraction solutions containing 10% and 20% α-hydroxy oxime are prepared by diluting an α-hydroxy oxime sold under the trade name of LIX–64 by General Mills Inc. with kerosene to yield the foregoing solutions.

A series of aqueous molybdenum bearing solutions are contacted with the organic extraction solutions in a 1:2 volumetric ratio for about 30 minutes. After the contact the phases are separated and samples of organic and aqueous phase are submitted for analysis. Results of the analysis are given in Table I.

TABLE I
Extraction using α-hydroxy oxime

| Sample | Volumetric percent α-hydroxy oxime | pH | Kd* | Percent Mo extracted | P.p.m. Cu in aqueous after extraction ($MoO_3$ basis) |
|---|---|---|---|---|---|
| 1 | 10 | 9.6 | 0.0016 | 0.15 | 2 |
| 2 | 20 | 9.6 | 0.0034 | 0.37 | 2 |
| 3 | 10 | 8.9 | 0.0015 | 0.14 | 2 |
| 4 | 20 | 8.9 | 0.0034 | 0.33 | 2 |
| 5 | 10 | 8.6 | 0.0033 | 0.22 | 2 |
| 6 | 20 | 8.6 | 0.0040 | 0.39 | 2 |
| 7 | 10 | 6.9 | 0.0040 | 0.96 | 2 |
| 8 | 20 | 6.9 | 0.0097 | 0.69 | 2 |
| 9 | 10 | 5.7 | 0.0070 | 1.50 | 2 |
| 10 | 20 | 5.7 | 0.0160 | | |
| 11 | 10 | 3.3 | Ppt | | |
| 12 | 20 | 3.3 | Ppt | Precipitate formed. | |
| 13 | 10 | 2.0 | Ppt | | |
| 14 | 20 | 2.0 | Ppt | | |
| 15 | 10 | 0.5 | Ppt | | |
| 16 | 20 | 0.5 | Ppt | | |

*Kd is the ratio of the concentration of molybdenum in the organic phase to the concentration of molybdenum in the aqueous phase on an equal volumetric basis.

As can be seen from the above data a pH of above about 5.7 is suitable, however, a pH of above about 6.9 is preferred. Additionally, as high as 20% α-hydroxy oxime can be used however a 10% by weight organic solution is preferred from an economic standpoint. Substantially similar results are obtained on molybdenum solutions having a higher level of copper up to about 15,000 p.p.m. $MoO_3$ basis. The copper barren aqueous solution containing the molybdenum is processed to metallurgical grade molybdenum by precipitating ammonium paramolybdate and converting to $MoO_3$ powder, then processing by normal powder metallurgy techniques to molybdenum metal.

EXAMPLE II

Aqueous molybdenum bearing solutions containing substantially the same levels of copper as in Example I and at a pH of about 9.6 are contacted with organic extraction solutions containing 5% and 10% by volume of an α-hydroxy oxime sold under the trade name LIX–64 by General Mills Inc. In each instance copper levels were below about 15 p.p.m. $MoO_3$ basis in the aqueous solution after contact with and subsequent separation between the aqueous solution and organic solution.

EXAMPLE III

Six samples of an aqueous molybdenum bearing solution containing substantially the same levels of copper as in Example I and at a pH of about 9.6 are contacted with a 10% by volume α-hydroxy oxime solution in kerosene. The period of contact is varied from 10 to 60 minutes. Samples of the aqueous phase after separation are analyzed for copper. Results are shown in Table II below.

TABLE II
Extraction of Cu varying percent α-hydroxy oxime

| Sample | α-hydroxy percent | Organic/aqueous ratio | pH | P.p.m. Cu in aqueous after extraction |
|---|---|---|---|---|
| 1 | 10 | 1:2 | 9.6 | 10 |
| 2 | 5 | 1:1 | 9.6 | 4 |

As is shown above the contact time should be at least about 20 minutes to obtain copper levels below about 15 p.p.m., $MoO_3$ basis.

EXAMPLE IV

Organic extraction solution containing 10% by volume of an α-hydroxy oxime in kerosene and containing 810 p.p.m. of copper is contacted with various aqueous stripping solutions on a 1:1 aqueous to organic ratio to remove the copper. Samples of the aqueous stripping solution after contact and separation are taken for analysis for copper. Results are given in Table III.

TABLE III

Copper stripping from extractant

| Sample | Stripping solution | P.p.m. Cu in aqueous after extraction |
|---|---|---|
| 1 | 100% $NH_4OH$ | <0.5 |
| 2 | 50% $NH_4OH$ | <0.5 |
| 3 | 10% $NH_4OH$ | <0.5 |
| 4 | 5% $NH_4OH$ | <0.5 |
| 5 | 50% $H_2SO_4$ | 700 |
| 6 | 5% $H_2SO_4$ | 700 |
| 7 | 50% HCl | 270 |
| 8 | 5% HCl | 540 |
| 9 | Concentrated $NH_4Cl$ | <0.5 |
| 10 | Dilute $NH_4Cl$ | <0.5 |

The above data indicates that acidic aqueous media is required to achieve stripping of copper from the α-hydroxy oxime extractant solution and that sulfuric acid is a preferred stripping solution.

EXAMPLE V

Organic extraction solutions substantially the same as those in Example IV are contacted with equal volumes of a 3 M sulfuric acid solution for 30 minutes. After separation the organic solution is contacted with virgin 3 M sulfuric acid for a second time and is repeated for a third time, and samples of the aqueous phase are taken for copper analysis. The organic phase is recycled to contact a molybdenum bearing copper containing aqueous solution as in Example I. Samples of the molybdenum solution are analyzed for copper. Results of these tests are shown in Table IV.

TABLE IV

| Sample | Aqueous | Organic | P.p.m. Cu in aqueous phase |
|---|---|---|---|
| 1 | Standard | | 820 |
| 2 | 3 M $H_2SO_4$ (1st contact) | 10% Lix-64 | 802 |
| 3 | 3 M $H_2SO_4$ (2nd contact) | 10% Lix-64 | 16 |
| 4 | 3 M $H_2SO_4$ (3rd contact) | 10% Lix-64 | 0.6 |
| 5 | Fresh technical molybdenum oxide. | Regenerated organic extractant. | 0.7 |

The above results indicate that essentially all of the copper is stripped from the organic extraction solution and that thereafter the organic is successfully regenerated and thereafter can be used to remove copper from a solution containing copper and molybdenum.

While there has been shown and described what are at present considered the preferred embodiment of the invention, it will be obvious to those skilled in the art that various changes and modifications may be made therein without departing from the scope of the invention as defined by the appended claims.

What is claimed is:

1. A process for removing copper from molybdenum comprising:
   (a) forming an aqueous solution containing said copper and molybdenum having a pH above about 5.7,
   (b) contacting said solution with an organic phase comprising a water-insoluble liquid hydrocarbon and an α-hydroxy oxime,
   (c) separating the resultant copper barren, molybdenum pregnant aqueous phase and the resultant copper laden organic phase and
   (d) recovering said molybdenum from said aqueous phase.

2. A process according to claim 1 wherein said pH is from about 6.9 to about 9.6.

3. A process according to claim 2 wherein said organic phase contains from about 5% by weight to about 20% by weight of α-hydroxyoxime.

4. A process according to claim 3 wherein said copper is recovered from said copper organic phase by stripping said organic with an aqueous solution of a mineral acid selected from the group consisting of sulfuric acid and hydrochloric acid.

5. A process according to claim 4 wherein said mineral acid is an aqueous solution of sulfuric acid containing from about 5% by weight to about 50% by weight of sulfuric acid.

References Cited

UNITED STATES PATENTS

| 3,224,873 | 12/1965 | Swanson | 75—101 R |
| 3,449,066 | 6/1969 | Swanson | 75—121 X |
| 3,455,677 | 7/1969 | Litz | 75—121 X |
| 3,196,107 | 7/1965 | Tomic | 75—117 X |

GEORGE T. OZAKI, Primary Examiner

U.S. Cl. X.R.

75—101 BE, 117, 119; 23—22, 15 W, 312 M